United States Patent [19]

Wilde

[11] 4,288,970

[45] Sep. 15, 1981

[54] ASPARAGUS HARVESTER

[76] Inventor: Lewis L. Wilde, 17139 Bailey Rd., Bailey, Mich. 49303

[21] Appl. No.: 73,556

[22] Filed: Sep. 7, 1979

[51] Int. Cl.³ .............................................. A01D 45/00
[52] U.S. Cl. .................. 56/327 A; 56/12.1; 56/16.5; 56/154
[58] Field of Search .......... 56/327 A, 154, 12.8–13.2, 56/16.5, 16.6, DIG. 8, 244, 12.1

[56] References Cited

U.S. PATENT DOCUMENTS

| | | | |
|---|---|---|---|
| 2,514,771 | 7/1950 | Klenke | 56/154 |
| 2,745,236 | 5/1956 | Eskridge | 56/154 |
| 2,861,298 | 11/1958 | Fowler | 56/16.5 |
| 3,760,573 | 9/1973 | Porter | 56/327 A |

FOREIGN PATENT DOCUMENTS 2638963 3/1978 Fed. Rep. of Germany ....... 56/16.6

Primary Examiner—Jay N. Eskovitz
Attorney, Agent, or Firm—Price, Heneveld, Huizenga & Cooper

[57] ABSTRACT

An asparagus harvester capable of producing a harvested product with quality comparable to that which is manually picked so as to be readily acceptable to processors. The harvester employs a recirculatory flexible saw cutter with a powered blade cleaner at the downstream end of the cut-off pass of the cutter. It cuts the stalks for transfer to an elevator conveyor by a front blower, the elevated stalks being elevated and then dropped to hopper means past a controlled blower nozzle serving as a debris separator, the hopper means being periodically elevated and having a conveyorized bottom for power discharge of the harvested asparagus.

3 Claims, 6 Drawing Figures

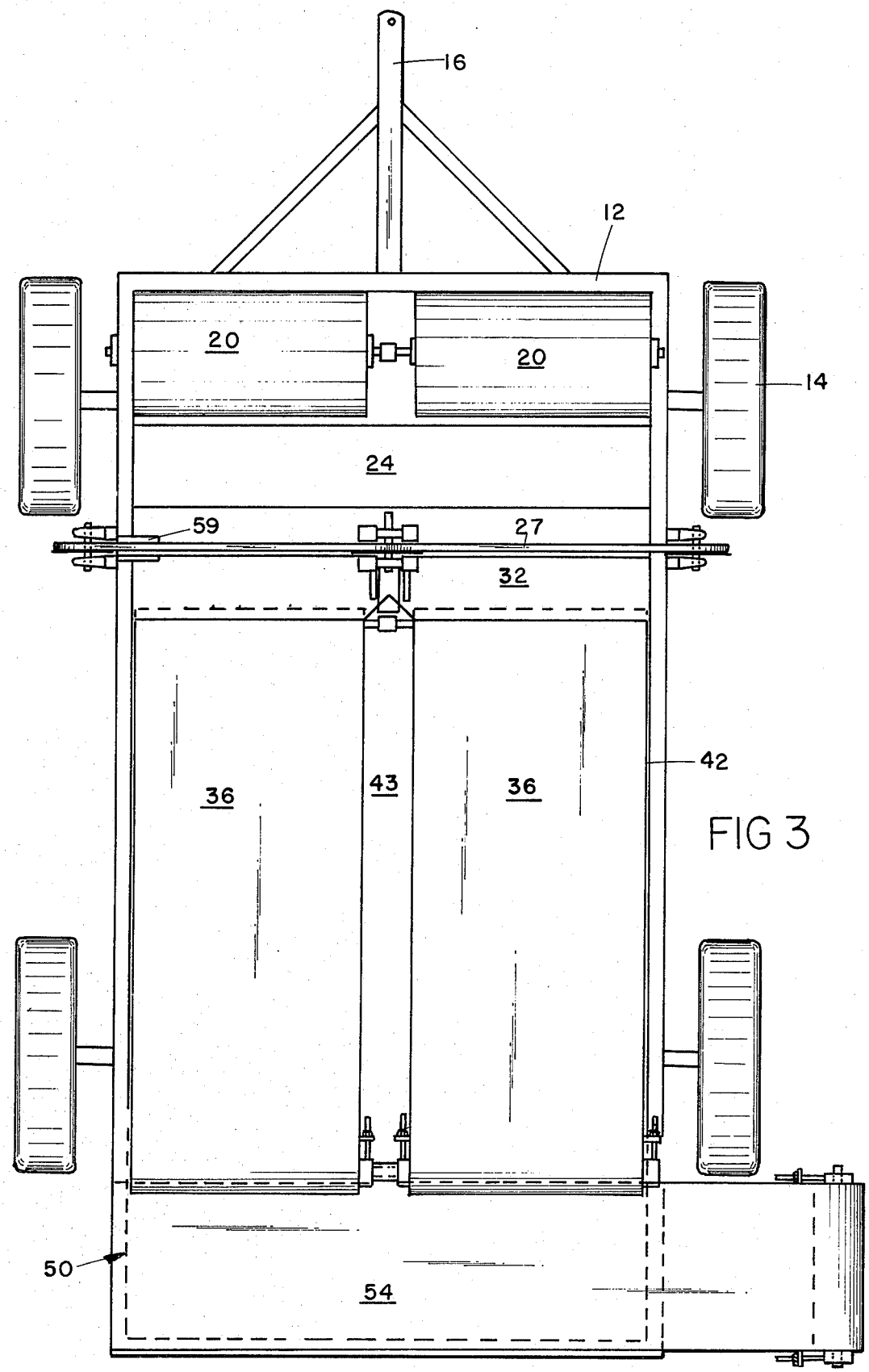

ASPARAGUS HARVESTER

BACKGROUND OF THE INVENTION

This invention relates to an asparagus harvester.

Asparagus farming is localized into various areas scattered across the continent. Its methods and problems are unique. The crop is normally picked manually and sold by farmers to local processing plants upon whom the farmers are highly dependent.

Because manual harvesting of asparagus constitutes a slow process that necessitates repeat picking of a field every second or third day to prevent the crop becoming overly mature, successful harvesting of large acreages is dependent upon a large and immediately available labor supply. Unfortunately, asparagus harvesters are not always blessed with such a labor supply. Consequently, a variety of asparagus harvesting machines have been proposed heretofore, and a few have been developed and put into operation. Of those machines that have been used, some were capable of harvesting a crop but there have been problems. Specifically, those machines simple enough to be dependable in operation tend to damage the asparagus and also to collect grass, weeds, dirt, etc., along with the crop. Consequently, processors to whom the farmer must normally sell his crop have been reluctant, and usually unwilling, to accept the crop. If so rejected, the crop is almost worthless to the farmer. Those machines which have been built to grip individual stalks so as to harvest without stalk damage and weeds etc. are so complex, particularly as to sensing, gripping and picking mechanisms, that maintenance is unreasonable and dependability is low. This is a particularly troublesome problem in that equipment dealers and service shops are not normally available for such specialized equipment.

Consequently, there has been a need for an asparagus harvesting machine which would be simple in construction, readily repairable with basically conventional parts, dependable, capable of harvesting asparagus over variable terrain, and capable of harvesting asparagus in fields containing grass, weeds, etc. without such being gathered with the asparagus stalks, to produce a crop acceptable to processors because possessing a quality basically comparable to manually harvested asparagus.

SUMMARY OF THE INVENTION

The basic object of this invention therefore is to provide an asparagus harvester that fulfills the above noted needs. The harvester of this invention employs a combination of features including a constantly cleaned, recirculatory band saw cutter cooperatively arranged with a front blower and a conveyor to elevate the cut stalks which are then dropped past a controlled outlet, debris-separator blower nozzle, into a hopper means having a conveyor bottom and elevatable for periodic discharge.

The apparatus is relatively simple in construction and dependable in operation. It is composed largely of standard components specially assembled to harvest asparagus. It has proven dependable in operation during repeated testing. The resulting asparagus crop is of a quality which has been found to be readily acceptable to processors.

BRIEF DESCRIPTION OF THE DRAWINGS

FIG. 3 is a plan view of the apparatus or harvester in FIGS. 1 and 2;

DESCRIPTION OF THE PREFERRED EMBODIMENT

Figure 2A:
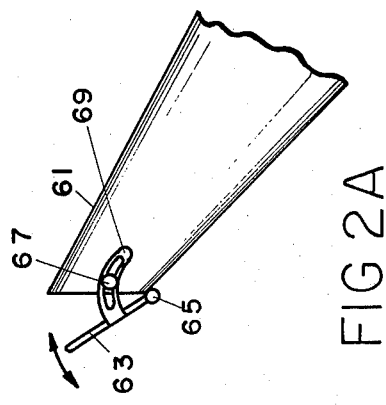
FIG. 2A is an enlarged elevational view of the debris separator nozzle of the harvester in FIG. 2.

The harvester 10 employs a chassis made up of a frame 12 to which four wheels 14 are mounted. It could be self-propelled. In the embodiment depicted, the structure is not self-propelled but rather employs a front draw tongue 16 for connection to a towing vehicle such as a typical farm tractor.

The harvester is hydraulically powered, the hydraulic pressure being generated by power from the tractor. More specifically, the standard power take-off shaft of the tractor is connected to a conventional hydraulic pump (not shown), which is associated with a standard control valve. The control valve is mounted on the front of the harvester to be readily accessible to the tractor operator for control of the speed of the harvester components.

At the front of the harvester is an elongated transversely positioned set of blowers 20 which together extend basically the width of the vehicle, generally between the two front wheels. Each blower has a conventional impeller 22 and a downwardly rearwardly directed nozzle 24 with its outlet oriented toward the space just above the lower horizontal pass of a bandsaw to be described. The nozzle extends the length of the saw lower pass. Blowers 20 are powered by hydraulic motor 21 to the output shaft of which is attached pulley 23 which drives belt 25 to pulley 27 on the blower shaft. Immediately behind the blowers is hydraulic fluid reservoir 26.

Behind the reservoir is the asparagus stalk cutting element, namely a continuous flexible band saw blade configured in a generally triangular pattern. The lower pass of the band saw is horizontally oriented, a controlled distance in inches above the level of the ground G over which the vehicle is passing. The path of the band saw is determined by three pulleys including a single central upper pulley 28a and a pair of laterally positioned lower pulleys 28b. These pulleys are mounted on a framework which protrudes above and below frame 12 of the vehicle, the upper portion 30a being triangular in shape and supporting the upper pulley 28a, while lower portion 30b supports lower pulleys 28b. The upper pulley 28a is powered by a hydraulic motor 31 mounted between a pair of straddling flanges 33 attached to frame portion 30a.

Each of these pulleys has a frictional peripheral surface formed, for example, of rubber, to inhibit lateral creeping or traveling tendencies of the recirculating bandsaw.

Figure 4:
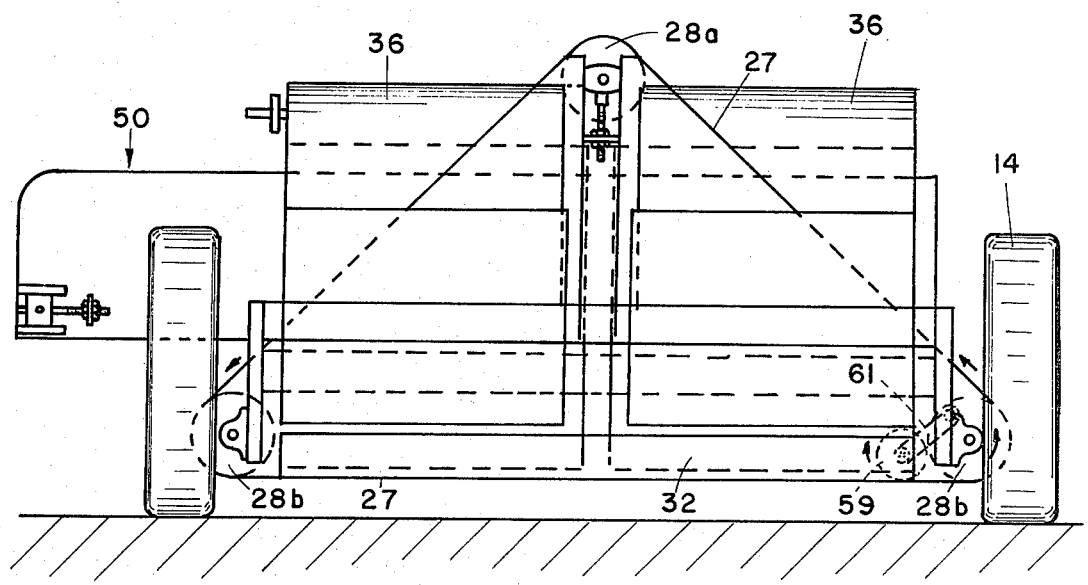
FIG. 4 is a front elevational view of the harvester.

Mounted immediately adjacent the lower pulley 28b which is downstream of the cutting pass, i.e. engages the bandsaw after its horizontal traverse for severance of asparagus stalks, is a powered cleaner wheel 59. This cleaner element is a revolving wheel mounted on bracket means 61 connected to the framework. The periphery of the cleaner wheel is in frictional engagement with the arcuate inner peripheral portion of pulley 28b not engaged by the bandsaw 27. This frictional engagement causes rotation of pulley 28b to rotate the cleaner wheel, but in the opposite angular direction, as depicted in FIG. 4 by arrows. The lower surface of cleaner wheel 59 is in rubbing engagement with the upper surface of the bandsaw 27, moving in the opposite direction. Thus, spinning of the cleaner wheel causes dirt and other debris to be constantly swept off the bandsaw just after the cutting pass has been made, to prevent this dirt and debris from detracking or otherwise disrupting the smooth flow of the bandsaw in its recirculatory travel.

Figure 1:
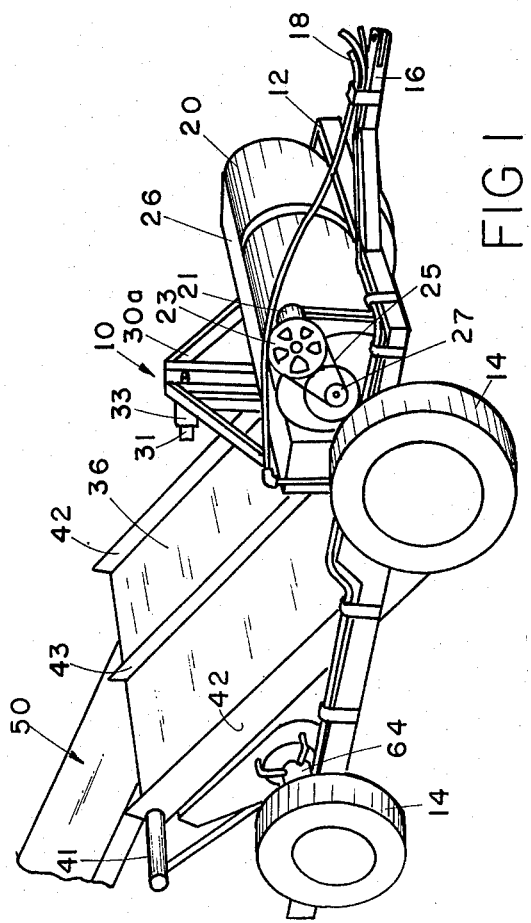
FIG. 1 is a perspective view of the asparagus harvester of this invention, viewed from the front right corner.
Figure 2:
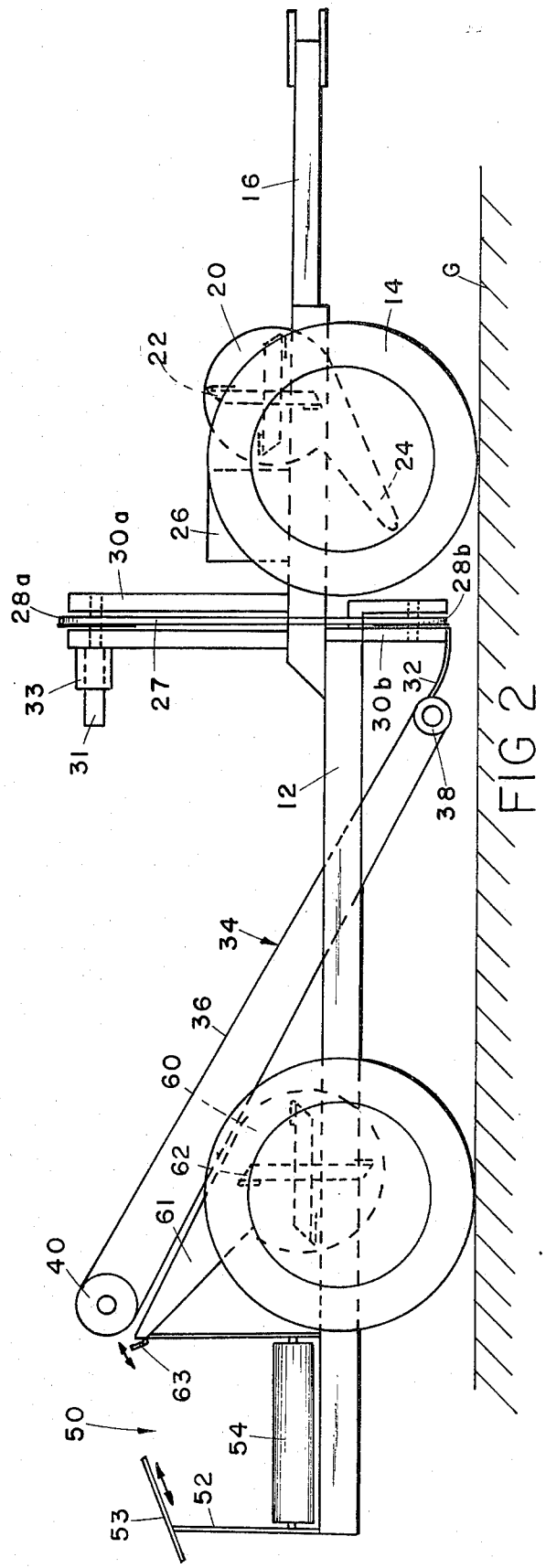
FIG. 2 is a side elevational view of the apparatus in FIG. 1.

Protruding rearwardly from and supported by lower frame portion 30b is a transfer plate 32. This plate extends basically from the vicinity of the lower pass of bandsaw 27 rearwardly-upwardly to a position immediately adjacent the lower front ends of a pair of like side-by-side conveyors 34. The conveyors extend upwardly and rearwardly to an elevated discharge position. Each includes a recirculatory belt 36, as well as a lower forward pulley 38 and an upper rearward pulley 40 around which the belt travels. Upper pulleys 40 are power driven by hydraulic motor 41 (FIG. 1). Protruding upwardly between the two belts is a shield 43 (FIG. 5) to prevent product falling between them. Protruding upwardly alongside the outside edges of the belts is a pair of vertical retaining walls 42 (FIG. 1).

Figure 5:
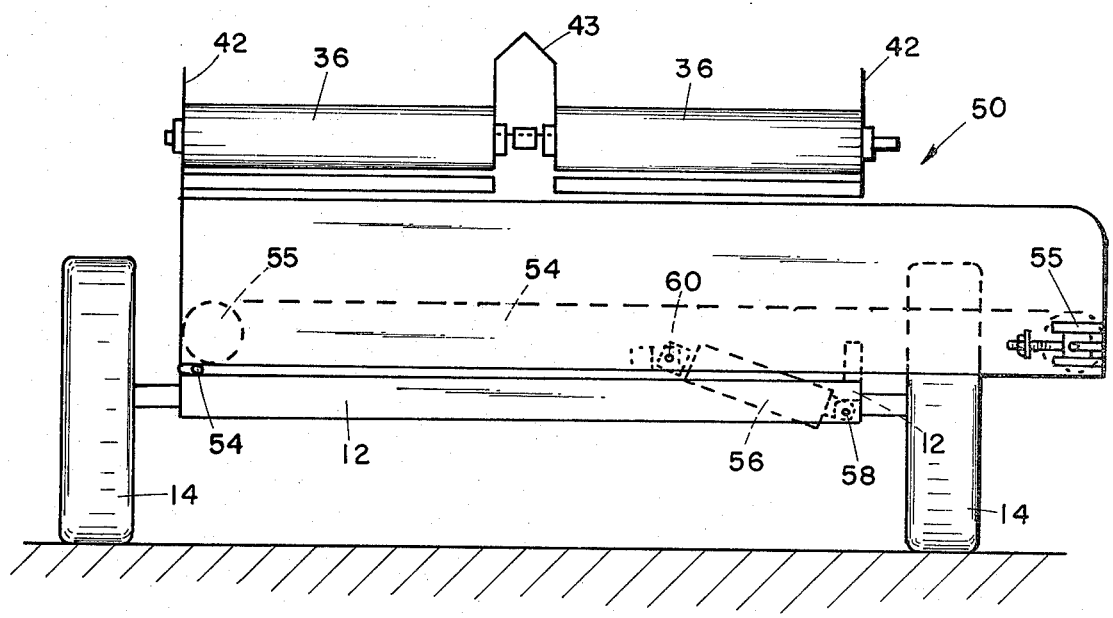
FIG. 5 is a rear elevational view of the harvester.

Located behind and beneath the upper rear portion of the conveyors 34 is transversely elongated hopper means 50 which includes an elongated receptacle 52 open at the top and having a conveyorized bottom, i.e. a belt conveyor 54 along the bottom, oriented transversely of the vehicle direction of travel. This hopper means is pivotally mounted at one of its ends, i.e. adjacent one side of the vehicle, on fore-to-aft pivot pin 54 (FIG. 5). This enables the hopper means to be elevated by a fluid cylinder 56 having one end affixed at 58 to vehicle frame 12, and the end of the piston rod extending therefrom pivotally connected at pin 60 to the underside of the hopper means. Thus, extension of fluid cylinder 56 causes the hopper means to pivot about pin 54, elevating the opposite end to a discharge condition depicted for example in FIG. 1. The conveyor belt 54 at the bottom of the hopper means recirculates around a pair of pulleys 55 at opposite ends of the hopper means, powered by a hydraulic motor (not shown).

An important aspect of this invention is the debris separator blower structure positioned generally between the discharge end of elevator conveyors 34 and the hopper means 50. This rear blower 60 extends the width of the conveyors and includes an impeller 62 power driven by a hydraulic motor 64 (FIG. 1). The elongated output nozzle of this blower is positioned beneath the discharge end of conveyors 34, i.e. beneath rear pulleys 40, and above the front wall of hopper means 50. The discharge nozzle 61 of this blower has a directional flow control member 63 to cause the nozzle outlet direction to be varied angularly. This allows an upward rearward pressurized air stream to be directed generally transverse to the direction of the falling asparagus stalks and debris, e.g. grass, dirt and weeds entrained therewith, for separation of the debris from the asparagus by allowing the heavier asparagus to continue its fall while the other materials are entrained with the air and carried rearwardly beyond the hopper. The rear portion of the hopper is preferably controllably partially covered by a generally horizontal slide plate 53 which projects from the rear edge of the hopper a controlled amount over the open top. This controlled cover device is employed cooperatively with the blower nozzle to assure separation of the particular debris encountered from the asparagus product. The nozzle outlet is variably controlled by pivoting flap 63 about its pivot hinge 65 (FIG. 2A). In the selected position, it is secured by twist lock 67 on track 69. The outlet control flap varies the angular direction of the upward-rearward air stream relative to the vertically falling crop and accompanying debris. Therefore, the lighter weight debris is blown rearwardly and upwardly away from the heavier falling asparagus, to be propelled beyond the hopper, or at least to the control cover so as to not fall into the hopper. This nozzle directional outlet control is significant to effective harvesting.

The details of construction of the apparatus may be altered in various ways within the concept, such being limited only by the appended claims.

The embodiments of the invention in which an exclusive property or privilege is claimed are defined as follows.

1. An asparagus harvester comprising a vehicle, a recirculatory bandsaw stalk cutter at the front of said vehicle, with its lower pass horizontal, an elevator conveyor to the rear of said lower pass, bandsaw blade engaging cutter cleaning means downstream of said cutter lower pass for cleaning said cutter of dirt and debris; said cutter cleaning means being driven in engagement with said bandsaw cutter, front blower means above and forwardly of said lower pass, with its outlet directed rearwardly generally toward said lower pass, to transfer cut asparagus stalks to said elevator conveyor, hopper means beneath the discharge end of said elevator conveyor, debris separator means between said discharge end and said hopper means comprising a separator blower having a controlled nozzle oriented upwardly and rearwardly beneath said discharge end for blowing falling debris away from falling asparagus stalks, and directional control means at said nozzle shiftable for varying the angular direction of the air stream from the nozzle relative to product falling from said elevator conveyor to said hopper means, and a debris deflector at the top of said hopper means to intercept deflected debris and keep it separated from asparagus stalks in said hopper means.

2. An asparagus harvester comprising a vehicle, a recirculatory bandsaw stalk cutter at the front of said vehicle, with its lower pass horizontal, cutter cleaning means downstream of said cutter lower pass for cleaning said cutter of dirt and debris, said cutter cleaning means being driven in engagement with said cutter, an elevator conveyor to the rear of said lower pass, front blower means above and forwardly of said lower pass, with its outlet directed rearwardly generally toward said lower pass, to transfer cut asparagus stalks to said elevator conveyor, hopper means beneath the discharge end of said elevator conveyor, debris separator means between said discharge end and said hopper means comprising a separator blower having a controlled outlet nozzle oriented upwardly and rearwardly beneath said discharge end for blowing falling debris away from falling asparagus stalks.

3. An asparagus harvester comprising a vehicle, a recirculatory bandsaw stalk cutter at the front of said vehicle, with its lower pass horizontal, a pair of pulleys at opposite ends of said lower pass, one downstream of said pass; bandsaw cutter cleaning means adjacent said downstream pulley for engaging said bandsaw cutter and thereby abrading dirt and debris from said cutter; said cutter cleaning means comprising a wheel driven by said downstream pulley and having its periphery traveling opposite to travel of said cutter; an elevator conveyor to the rear of said lower pass, front blower means above and forwardly of said lower pass, with its outlet directed rearwardly generally toward said lower pass, to transfer cut asparagus stalks to said elevator conveyor, hopper means beneath the discharge end of said elevator conveyor, debris separator means between said discharge end and said hopper means comprising a separator blower having a controlled outlet nozzle oriented upwardly and rearwardly beneath said discharge end for blowing falling debris away from falling asparagus stalks.

* * * * *